Patented Apr. 24, 1945

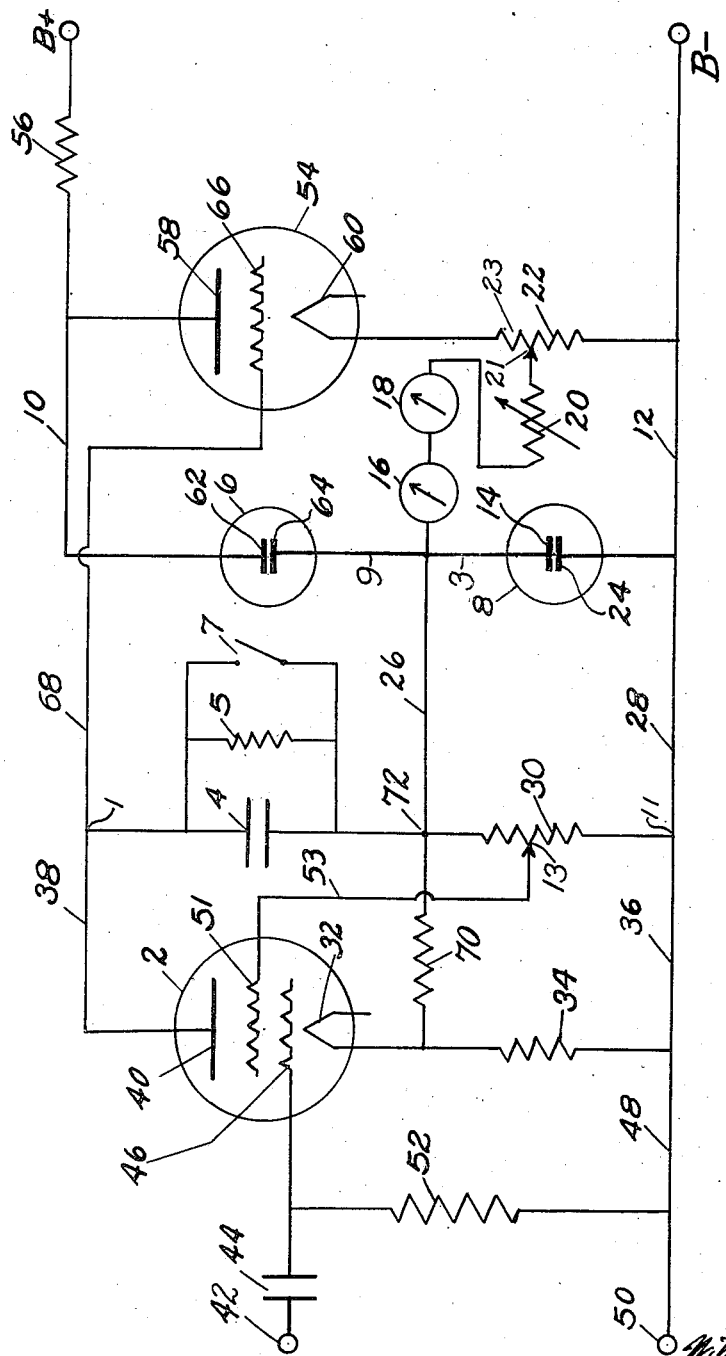

2,374,248

UNITED STATES PATENT OFFICE 2,374,248

PULSE-INTEGRATING CIRCUIT

William N. Tuttle, Concord, Mass., assignor to General Radio Company, Cambridge, Mass., a corporation of Massachusetts Application December 2, 1941, Serial No. 421,322

13 Claims. (Cl. 171—95)

The present invention relates to pulse-integrating circuits, such as are used to count random pulses.

In the study of natural and artificial radioactivity, cosmic rays, and the like, it is common to employ counter tubes of the so-called Geiger-Muller type to produce transient electrical discharges upon the entrance of beta or gamma rays, or other rays or particles into the counter tube. In the customary use of the Geiger-Muller counter, the number of such transient discharges or pulses through a counting tube is used as a measure of the number of rays or particles entering the tube. Owing to the fact that these transient discharges occur at random, however, it is difficult to obtain an accurate count, particularly when the discharges occur very rapidly.

Many methods have accordingly been proposed for obtaining an accurate count of these discharges, irrespective of the random rate at which they occur. According to one method, which has been quite generally used, for example, auxiliary electric circuits are employed to cause the discharges to generate voltage pulses that are equal in size and shape, independently of the rate of repetition of the discharge up to a limit determined by the time constants or the resolving power of the apparatus. These equal-voltage pulses have been employed to obtain uniform output-current pulses in an amplifying or integrating vacuum tube; and these uniform output-current pulses, in turn, have been integrated by a condenser to cause operation of a continuously reading microammeter indicating instrument. The meter has been calibrated to read directly in terms of the rate of occurrence of the counter-tube discharges, as, for example, counts per minute, thus yielding a measurement of the number of pulses applied to the grid of the amplifier tube. A description of a counting-rate meter operating on this principle may be found in an article, entitled, "Improved counting rate meter," by Robley D. Evans and Robert L. Alder, in the Review of Scientific Instruments, vol. 10, November, 1939, pages 332–336. It comprises a pulse-shaping circuit and a pulse-integrating or pulse-counting circuit.

An object of the present invention is to provide an improved pulse-integrating circuit.

A further object is to provide an improved integrating-and-metering circuit of the above-described character.

Another object is to provide greater output current for operating a rugged meter or recorder in integrating-and-metering circuits of the above-described character.

Still a further object is to provide an integrating meter of the above-described type that shall be more stable and more accurate in calibration and shall have reduced drift of the zero reading.

A further object still is to provide an integrating-and-metering circuit of the above-described type that shall be capable of adjustment over a wide range of sensitivities suitable for many different applications.

In the circuit described in the said article, the output-current pulses of the amplifying or integrating tube are themselves employed, after being integrated by the said condenser, to operate the microammeter indicating instrument. This requires that the time constant RC of the meter and condenser circuit shall be large in comparison with the average interval between pulses, and consequently requires the use not only of a sensitive meter, but also of a very large condenser, if low counting rates are to be satisfactorily indicated. The sense in which the term "large" is employed is explained hereinafter.

Still another object of the present invention, therefore, is to provide an improved degenerative vacuum-tube voltmeter of high input impedance, so that satisfactory indications of average counting rate may be obtained over a wide range of counting rates even when a small integrating condenser is employed, using the term "small" in the above sense.

Owing to the dielectric absorption of the said prior-art large condenser, the use of instruments of this kind heretofore available has been subject to the serious handicap that the meter reading has had a tendency to become influenced by its previous indication. With the end in view of reducing this tendency, still a further object of the present invention is to provide an integrating-and-indicating meter that shall have very low hysteresis effect.

Another object is to provide a stable pulse-integrating and metering circuit which can be mains-operated, and not require the use of any auxiliary batteries.

A further feature of the invention contemplates a novel use of a polystyrene condenser.

Other and further objects will be explained hereinafter, and will be particularly pointed out in the appended claims.

The invention will now be more fully described in connection with the accompanying drawing, the single figure of which illustrates a preferred embodiment thereof.

The invention embodies a vacuum-tube integrating amplifier 2, shown provided with a cathode 32, a control electrode 46, a screen electrode 51 and an anode 40. This integrating tube 2 may be the same amplifier as that shown at T₃, Fig. 2, page 333, of the said article, and it may, if desired, be connected to the circuits preceding it in the same manner as illustrated and described therein. It is here shown connected into an input circuit extending from an input terminal 50, by way of a conductor 48, and through a resistor 34, to the cathode 32; from the cathode 32, through the space in the tube 2, to the control electrode 46; and from the control electrode 46, through a condenser 44, to an input terminal 42. A biasing resistor 52, for impressing a negative bias upon the control electrode 46, is shown connected between the conductor 48 and the control electrode 46. The biasing voltage is obtained from a regulating glow-lamp 8. Fixed voltage-dividing resistors 70 and 34 are connected across the glow-lamp 8 to provide the cathode bias for the tube 2. The cathode bias provided by this combination, and impressed on the control electrode 46 by the biasing resistor 52, maintains the tube 2 normally non-conducting, except when a pulse is applied to the input terminals 42, 50. There is normally no plate current, therefore, in the tube 2 in the absence of the said pulses.

The tube 2 is shown connected also into an anode or output circuit extending from the cathode 32, through the resistor 34, by way of conductors 36 and 28, through the regulating glow-lamp 8 and, by way of a conductor 26, to a terminal 72; from the terminal 72, through a condenser 4 and a resistor-leak 5, in parallel to a terminal 1; and from the terminal 1, by way of a conductor 38, to the anode 40. The plate-supply voltage for this output circuit, like the biasing voltage for the biasing resistor 52, is obtained from the regulating glow-lamp 8. The resistor 70 connects the cathode 32 to the terminal 72 to produce a biasing voltage across the resistor 34.

The glow-lamp 8 receives its energy from any desired direct-current source, represented by the positive and negative B+ and B— terminals of a mains-operated power supply (not shown). The glow lamp 8 is shown connected in series with a regulating glow-lamp 6 to the B+ and B— terminals by conductors 10 and 12. The terminal B— is connected to the cathode 24 of the glow-lamp 8 by the conductor 12, the anode 14 of the glow-lamp 8 is connected to the cathode 64 of the glow-lamp 6 by conductors 3 and 9, and the anode 62 of the glow-lamp 6 is connected by the conductor 10, through an impedance 56, shown as a resistor, to the terminal B+. The anode 14 of the glow-lamp 8 is thus connected by the conductors 3 and 26 to the terminal 72 which, as before described, is connected to the anode 40 of the integrating tube 2 through the condenser 4. The regulating glow-lamps 6 and 8 may be the type known as VR-105 having an operating potential of approximately 105 volts and giving a total regulated voltage of 210 volts across the two lamps in series. In this case the supply voltage at the terminals B— and B+ would have to be materially in excess of 210 volts, say 325 or 350 volts, to allow sufficient voltage drop in the resistor 56 to provide satisfactory regulating action.

The terminal 72 is connected also to one terminal of an impedance 30, shown as a resistor. This terminal 72 of the impedance 30, therefore, is connected, by the conductors 26 and 3, to the anode 14 of the glow-lamp 8. The other terminal 11 of the impedance 30 is connected by the conductor 28 to the cathode 24 of the glow-lamp 8. The voltage obtained from the voltage-supply terminals B+, B— across the glow-lamp 8 is thus impressed across the impedance 30. The impedance 30 is shown provided with a variable tap 13, from which voltage is supplied, by way of a conductor 53, to the screen electrode 51. The impedance 30 thus serves the function of a potentiometer or voltage-divider for providing a regulated or variable screen potential for the integrating tube 2.

Normally, at times when no pulses occur, the tube 2 is biased through the grid resistor 52 below the cut-off point to a potential between the cathode 32 and the control electrode 46 determined by the voltage-regulating glow-lamp 8 and the biasing resistors 70 and 34. The plate impedance of the tube 2, between the cathode 32 and the anode 40, therefore, will normally provide the charging path for the condenser 4 when any random pulse of voltage is applied to the input terminals 42 and 50.

When the bias is momentarily overcome by a pulse, the tube 2 becomes momentarily conducting.

Since the regulating glow-lamp 8 is connected, by the conductors 12, 3 and 26, between the grounded B— terminal and the terminal 72, at one side of the condenser 4, this side of the condenser 4 is subjected to a potential above that of the grounded B— terminal. The terminal 1 at the other side of the condenser 4, however, is in the absence of pulses subjected to substantially the same potential, through the resistor 5.

As explained in the said article, a pulse equalizer is employed to convert the pulses into pulses of equal amplitude and time duration prior to their impressment upon the terminals 42 and 50 of the input circuit of the tube 2, regardless of the characteristics of the pulses applied to it. This pulse equalizer takes the form usually of a multivibrator. The tube 2 does not need to function to equalize the pulses, as the pulses applied to the tube are random in spacing or frequency occurrence only. The tube 2 and its associated circuits could be designed to limit the amplitudes of the pulses, but this is not generally necessary.

Since this circuit need not include pulse-equalizing mechanism, as the pulses are equalized, in amplitude and time duration, before they are applied to the input terminals 42, 50, it is desirable that the wave-form, the frequency of which is to be measured, have a definite shape, that is, the wave-form should be constituted of a succession of pulses of equal amplitude and equal time duration.

Random unidirectional pulses of equal amplitude and equal time duration impressed upon the input terminals 42 and 50 will become applied to the condenser 4, by means of the tube 2, to produce a current flow in the above-traced output circuit of the tube 2. The tube 2 thus functions as a valve. This current will tend to shift the potential of the terminal 1 at the said other side of the condenser, causing it to approach the value of the potential of the cathode 32, more or less, depending upon the value of the said plate impedance of the tube 2, and the rate at which pulses are applied to the grid circuit.

The tube 2 converts the constant-amplitude pulses applied to its input circuit into constant-current pulses in its output circuit. Each pulse raises the potential across the condenser 4 by a definite amount depending upon the size of the condenser 4.

The direct voltage across the condenser 4 thus tends to rise in equal increments proportional to the number of pulses. The effects of the random pulses applied to the input-terminals 42, 50 are thus added momentarily across the condenser 4, which explains the term "integration," as employed in this art. However, the charge on the condenser 4 discharges through the resistor 5. The resistor 5 allows the charge on the condenser 4 to leak off at a relatively slow rate proportional to the rate at which the pulses are applied, which constitutes a differentiating action to differentiate the integrated pulses, contrary to the integrating action upon the condenser. This equilibrium value of the discharge current will be equal to the total of the charging current pulses of uniform amplitude received per second from the output circuit of the integrating tube 2, and it will be proportional to the average rate of occurrence of the pulses. The condenser 4 therefore remains charged to a value depending upon the average frequency of the pulses.

The combination of the tube 2, the condenser 4 and the resistor 5 thus produces a voltage in proportion to the pulse rate. These circuit elements are combined with a novel counting circuit comprising a novel direct-current vacuum-tube voltmeter, providing a novel counting-rate meter for yielding great accuracy in reading the frequency of a particular type of pulse. The actual voltage across the condenser 4 and the resistor 5 is proportional to the average pulse rate. The net result of the integrating action of the condenser 4 and the differentiating action of the leak resistor 5 is a reading in the meter of the average plate current in the tube 2 produced by the random pulses.

The pulse-integrating circuit comprises the vacuum tube 2, the condenser 4 and the high-resistance resistor 5 shunting the condenser 4, allowing the electricity to leak slowly off the condenser 4. The condenser 4 and the resistor 5, in parallel, constitute a coupled RC network system or tank circuit in the anode circuit of the integrating tube 2. The tube 2 acts as a valve to apply fixed amounts of electricity to the condenser 4. The capacitance of the condenser 4 and the resistance of the resistor 5 have a time constant large compared to the average interval between the pulses to be integrated. The condenser will then discharge only slightly between pulses, and will maintain an essentially constant direct-current potential. This tank circuit 4, 5 constitutes a low-pass filter for converting the series of pulses obtained from the tube 2 into a more or less steady current through the resistor 5. On the average, the charging current of the condenser 4 and the discharging current must be equal.

This circuit is definitely a direct-current device, and relies for its operation upon direct coupling to the tube 2 and to the vacuum-tube voltmeter. The current through the resistor 5, or the voltage across it, is a measure of the counting rate. The output current or voltage is proportional to the average rate at which the random-frequency pulses are applied to the input circuit.

The condenser 4 is thereupon discharged through the resistor 5 across the input circuit of a vacuum-tube voltmeter comprising a vacuum tube 54 having a cathode 60, a control electrode 66, and an anode 58, and comprising also a recorder 16 and a meter or indicating instrument 18 which, in consequence, give a continuous reading of the average rate at which the pulses occur.

The input circuit of the vacuum-tube voltmeter is connected directly across the condenser 4 and the resistor 5. It extends from the terminal 1, at one side of the condenser 4 and the resistor 5, by way of the conductor 68, to the control electrode 66; then through the space in the tube 54 to the cathode 60, and through a resistor 23, to a variable tap 21 that adjustably separates the resistor 23 from a resistor 22. At the tap 21, the input circuit divides into two branches, each extending to the terminal 72, at the other side of the condenser 4 and the resistor 5. One of these branches continues from the tap 21, through the resistor 22, to the conductor 12, where this branch again divides, one path extending by way of the conductor 28 and through the resistor 30 to the terminal 72, and the other path extending through the voltage-regulating glow-tube 8, by way of the conductors 3 and 26, to the terminal 72. The other branch extends from the tap 21, through a variable impedance 20, shown as a resistor, the instruments 18 and 16, and by way of the conductor 26, to the terminal 72. The impedance of the various circuit elements in the said branches and the said paths between the cathode 60 and the terminal 72 is low compared to the impedance of the voltmeter vacuum tube 54 between the cathode 60 and the control electrode 66, so does not enter substantially into the input-circuit connections, except insofar as to facilitate the hereinafter described degeneration. The discharges of the condenser 4 through this input circuit of the voltmeter tube 54 thus introduce potential changes on the control electrode 66 with respect to the cathode 60.

The input impedance of this voltmeter, being determined by the grid current of the tube 54 at negative-grid bias, is extremely high, so that substantially any required value of resistance of the resistor 5 may be employed to obtain the desired time constant RC.

The potential changes produced, as above described, upon the control electrode 66, in the input circuit of the voltmeter tube 54, are reflected in the output circuit of this tube. This output circuit extends from the cathode 60, through the resistor 23, to the tap 21; then through the variable impedance 20, and through the meter indicating instrument 18 and the recorder 16, and by way of the conductor 9, to the cathode 64 of the glow-tube 6; and from the anode 62 of the glow-tube 6, by way of the conductor 10, to the anode 58. The plate-supply voltage for this output circuit is thus obtained from the regulating glow-lamp 6, which, in turn, as before explained, is supplied with energy from the power-supply B+, B—.

The instruments 16 and 18 and the resistors 20 and 23 are common to the input and output circuits of the vacuum-tube voltmeter, thus providing degenerative action.

Voltage drops are accordingly produced across the resistors 20 and 23, and current is caused to flow through the instruments 16 and 18. These resistors 20 and 23 will be subjected to the polarity of the terminal 72, at one side of the condenser 4, since they are connected to this terminal 72 by the conductor 26.

Irrespective of the spacing or the frequency of the random pulses, since the resulting current pulses impressed on the condenser 4 are of uniform intensity, they will produce an average current through the resistor 5 and, therefore, in the meter. The indicating instrument 18, connected in this output circuit of the voltmeter so as to respond to the current thereof, will indicate the steady potential of the condenser 4. It may therefore be calibrated, in terms of the average frequency of the pulses, to produce a continuous reading corresponding to the average rate of the integrated current pulses. The reading of the voltmeter, as before explained, will thus be a measure of the average counting rate.

The glow lamp 8, which supplies the plate current for the tube 2, provides also a current through the instruments 16 and 18 opposite to that which flows through the output circuit of the tube 54. When no pulses are applied to the input circuit, therefore, the instruments 16 and 18 read zero. When, on the other hand, a series of pulses is applied to the input circuit, the potential across the condenser 4 increases, thus tending to make the grid 66 of the tube 54 more negative with respect to the cathode 60. This tends to reduce the plate current of this tube, which reduces the current flowing through the resistor 23, and shifts the current flowing through the resistor 20 and the instruments 16 and 18 in such manner as to reduce the net effective shift in voltage between the grid 66 and the cathode 60 to a somewhat lower value than the actual change in voltage across the condenser 4. This results from the degenerative action. Is also results in an effective increased impedance between the grid 66 and the terminal 72, since the voltage developed across the elements 23, 20, 16 and 18 is in such manner as to oppose any voltage applied between the grid 66 and terminal 72, which is the voltage across the condenser 4.

The tube 2 and the condenser 4 together form a storage or direct-current integrator. Both components are essential for this function, the condenser 4 to store the energy, and the tube 2 to control the charging of the condenser by fixed amounts of current. The net result, however, is a current through the resistor 5 proportional to the rate at which the pulses are received. Naturally, the higher the value of the resistance of the resistor 5, the longer the period of integration. The combined function of the tube 2, the condenser 4 and the resistor 5 is to provide an output proportional to a rate rather than to the integrated total. The time constant is long and the pulse rate is averaged over a relatively long period of time.

It has before been explained that the voltage of the glow-lamp 8, derived from the battery B+, B—, is impressed upon the output circuit of the tube 2. It is impressed also upon a circuit extending from its anode 14, by way of the conductor 3, through the recorder 16, the meter indicating instrument 18, and the variable impedance 20, to the variable tap 21; and from this variable tap 21, through the resistor 22, by way of the conductor 12, to the cathode 24 of the glow-lamp 8.

The voltage across the glow-lamp 8 is obviously applied to this circuit in such sense as to produce a current through the meter indicating instrument 18 in a direction opposite to the direction of the current that travels through the meter 18 by reason of its connection in the output circuit of the voltmeter 54, in series with the glow-lamp 6. These two opposing currents through the meter indicating instrument 18 may be so designed as normally completely to neutralize. At times when no pulses occur through the tube 2, therefore, the meter indicating instrument 18 will read zero. Any change of the current in the output circuit of the voltmeter 54, produced by pulses in the tube 2, will manifest itself as a deviation of the meter indication from the zero or balance position.

The resistor 5 that is normally shunted across the condenser 4 may be momentarily short-circuited by a switch 7 to enable checking the zero-reading of the indicating instrument 18.

This neutralization to zero of the normal meter current may be effected with the indicating instrument 18 located either in the plate circuit or, as illustrated, in the cathode circuit. An advantage of using the cathode type of circuit for this purpose is that it is in that manner possible to use for a further purpose the source of regulated voltage provided by the regulating glow-tube 8 that opposes the current flow in the meter 18. The same source of voltage may be used to provide also, as before described, regulated plate-supply voltage for the output circuit of the integrating tube 2, and regulated grid-biasing voltage for the control grid from the voltage-dividing resistors 70 and 34, and regulated and adjustable screen-grid potential across the potentiometer 30.

The glow-lamp 6 may, of course, be replaced by any other suitable source of voltage, such as a resistor. Indeed, the resistor 56 may itself replace the glow-lamp 6, since the plate-potential variations of the vacuum tube 54 have relatively little effect on the plate current. This is particularly the case when a screen-grid tube (not shown) is substituted for the triode 54. The use of a pentode might be inconvenient, because of the desirability of constant screen voltage independent of the cathode. The above-traced input and output circuits of the voltmeter tube 54 both include the resistors 20 and 23. This is in order to provide the well known cathode or current negative degenerative feed-back between these input and output circuits. The vacuum-tube voltmeter is designed to be highly degenerative, with a consequent high degree of linearity. In highly degenerative circuits, the value of the deflection depends upon the degenerative resistance, and not on the tube characteristics. The constancy of the calibration depends, therefore, upon the constancy of the total cathode-circuit resistance of the voltmeter tube 54. As the circuit of the glow-tube 8 has low resistance, variations produced by the opposing voltage in its impedance 20 can not affect the sensitivity. This facilitates the calibration of this degenerative vacuum-tube voltmeter circuit. The low impedance of the cathode circuit, furthermore, permits of a great part of degenerative resistance in the form of fixed resistors.

A further advantage in connecting the indicating instrument 18 in the cathode circuit of the tube 54 and in employing the glow-lamp 8 to balance out the initial current is that a large proportion of the resistance determining the negative feedback or degenerative coupling between the output and input circuits of the tube 54 may be included directly in series with the indicating instrument. Since the resistance to variations in current of the glow-lamp is small in comparison with the other circuit resistances, the total degenerative coupling resistance consists essentially of the resistance of the resistor 23 in series with the parallel combination of the resistance of the resistor 22 and the total value of the resistance of the resistor 20 and the resistance of the indicating instrument 18 and the recorder 16. The resistor 23 provides the negative bias for the control grid 66 and its resistance is usually a relatively small fraction of the resistance of the resistor 22. It is possible also to keep the resistance of the resistor 20 small in comparison with that of the resistor 22 and still obtain sufficient degenerative coupling to make the calibration highly stable and linear and only slightly dependent on the characteristics of the tube 54. Good linearity is desirable to permit direct reading on commercial instruments; stability of calibration is also enhanced. Since, therefore, both the resistors 23 and 22 contribute relatively little to the total effective degenerative resistance, the sensitivity of the instrument can be varied over a considerable range by adjustment only of the variable resistor 20. Moreover, since no current flows through the resistor 20 when the meter reading is balanced to zero, the sensitivity adjustment can be made without disturbing the zero adjustment, the latter being made by varying the setting of the movable tap 21.

This variation in sensitivity by variation of the degenerative resistor 20 is thus combined with additional variation in sensitivity resulting from variation of the screen potential of the integrating tube 2 by means of the voltage-dividing impedance 30. An extremely wide range of sensitivity can thus be readily obtained.

The invention provides, furthermore, for a high output to operate a rugged meter indicating instrument 16 and recorder 18. For this, and for good linearity, a high trans-conductance is desirable. Without employing a pentode for the voltmeter tube 54, a very high trans-conductance is obtained with relatively small anode current.

The advantages described above are attainable with practically any size of condenser 4. As opposed to a condenser which, as described in the said publication, may have a capacitance as large as 100 microfarads, a feature of the present invention, however, may contemplate a practicable arrangement according to which this capacitance may be very small, say, on the order of only two microfarads. Even the two microfarads, however, may be large compared to the resistance of the resistor.

If a small condenser is employed, the current through the discharge resistor is small, and it is either necessary to employ a sensitive microammeter or galvanometer to indicate the discharge current through the resistance or to employ a vacuum tube voltmeter to indicate the condenser voltage. Vacuum-tube voltmeter circuits previously employed have had unsatisfactory linearity and stability. The present arrangement, as before stated, however, may employ a relatively very small condenser, say on the order of only two microfarads, and the degenerative type of circuit employed results in high stability and permits the use of a rugged meter.

Polystyrene is known to have a very low power factor in comparison with other materials, particularly at high frequencies. I have found, however, that it also possesses the property of extremely low dielectric absorptio or hysteresis which is a property determining the power factor at very low frequencies and determining also the response of a condenser to slowly varying direct currents.

A condenser having dielectric hysteresis is influenced by its previous state of charge and if used in the present circuit tends to give a meter reading in error in the direction of its previous reading. This is not only a disadvantage when several measurements of different counting rates are to be measured in succession, but it also results in the meter returning very slowly to its true indication after checking the zero setting by closing the switch 7 across the condenser 4. Also, when changing from one range of sensitivity to another by changing the screen potential of the tube 2, as above described, a long time would be required for the condenser 4 to come to equilibrium at the new potential.

When polystyrene is employed for the dielectric of the condenser 4, however, the dielectric absorption has been found to be negligible and changes in the sensitivity of the instrument can be made as often as desired without the inconvenience of waiting for new equilibrium conditions to be established.

A condenser having a polystyrene dielectric is also very useful in other applications where low dielectric absorption or hysteresis is important, as in the construction of electrical circuits for the study of the mechanical vibrations of machinery, and in any cases where a condenser of low power factor is required at very low frequencies.

Modifications will occur to persons skilled in the art and all such modifications are considered to fall within the spirit and scope of the invention, as defined in the appended claims.

What is claimed is:

1. A pulse-integrating system for integrating random pulses having, in combination, an amplifier having an input circuit upon which the pulses may be impressed and an output circuit, a condenser connected to the output circuit, an impedance connected in parallel with the condenser, a vacuum-tube voltmeter having an input circuit connected to the condenser and an output circuit having an instrument, means for establishing a current in the vacuum-tube voltmeter output circuit to establish a current through the instrument, a source of energy, and means for applying the potential of the source to oppose the flow of current from the vacuum-tube voltmeter output circuit through the instrument and to establish a flow of current in the amplifier output circuit, the capacitance of the condenser and the resistance of the impedance having a time constant large compared to the average interval between the pulses to be integrated.

2. A pulse-counting system having, in combination, vacuum-tube apparatus having an input circuit upon which pulses may be impressed and an output circuit, means for connecting a source of voltage to the output circuit to establish a current in the output circuit in response to the voltage of the pulses impressed upon the input circuit, means for biasing the input circuit to prevent current flow in the output circuit in the absence of pulses impressed upon the input circuit to render the output circuit normally non-conducting between pulses, means for impressing the pulses upon the input circuit to render the output circuit conducting during pulses, means comprising the biasing means for converting the pulses impressed upon the input circuit into current pulses in the output circuit, means for integrating a plurality of the charges produced by the current pulses in the output circuit comprising a condenser upon which the charges may become integrated connected to the output circuit to be charged by the current pulses in the output circuit and a resistor of relatively high resistance connected across the condenser, and a vacuum-tube voltmeter having an input circuit of relatively high impedance connected across the condenser to measure its integrated charge and an output circuit degeneratively connected to the vacuum-tube-voltmeter input circuit, the vacuum-tube-voltmeter output circuit having an instrument for producing a continuous reading corresponding to the average rate of the integrated current pulses.

3. An electric system having, in combination, vacuum-tube apparatus having an input circuit upon which a voltage may be impressed and an output circuit, means for connecting a source of voltage to the output circuit to establish a current in the output circuit in response to the voltage impressed upon the input circuit, a vacuum-tube voltmeter having an input circuit and an output circuit having an instrument, the vacuum-tube-apparatus output circuit being connected to the vacuum-tube-voltmeter input circuit, means for connecting a source of voltage to the vacuum-tube-voltmeter output circuit to establish current in the instrument, and means for subjecting the instrument to the voltage of the first-named source of voltage in a direction such as to oppose and normally to neutralize the said current in the instrument.

4. An electric system having, in combination, vacuum-tube apparatus having an input circuit upon which a voltage may be impressed and an output circuit, a glow-lamp, means for supplying voltage to the glow-lamp, means for connecting the glow-lamp to the output circuit to establish a current in the output circuit in response to the voltage impressed upon the input circuit, a vacuum-tube voltmeter having an input circuit and an output circuit having an instrument, the vacuum-tube-apparatus output circuit being connected to the vacuum-tube-voltmeter input circuit to impress the voltage of the vacuum-tube-apparatus output circuit upon the vacuum-tube-voltmeter input circuit, means for connecting a source of voltage to the vacuum-tube-voltmeter output circuit to establish a current in the instrument, and means for subjecting the instrument to the voltage of the glow-lamp in a direction such as to oppose and normally to neutralize the said current in the instrument.

5. A pulse-counting system having, in combination, vacuum-tube apparatus having an input circuit upon which the pulses may be impressed and an output circuit, a condenser connected to the output circuit, a degenerative vacuum-tube voltmeter having an input circuit connected across the condenser and an output circuit having an instrument, means for establishing a current in the vacuum-tube-voltmeter output circuit to establish a current in the instrument, a source of energy, and means for applying the potential of the source to oppose and normally to neutralize the flow of current from the vacuum-tube-voltmeter output circuit in the instrument and to establish a flow of current in the vacuum-tube-apparatus output circuit.

6. An electric system having, in combination, vacuum-tube apparatus having an input circuit upon which a voltage may be impressed and an output circuit, a glow-lamp, means for supplying voltage to the glow-lamp, means for connecting the glow-lamp to the output circuit to establish a current in the output circuit in response to the voltage impressed upon the input circuit, a vacuum-tube voltmeter having an input circuit and an output circuit having an instrument, the vacuum-tube-apparatus output circuit being connected to the vacuum-tube-voltmeter input circuit to impress the voltage of the vacuum-tube-apparatus output circuit upon the vacuum-tube-voltmeter input circuit, a second glow-lamp, means for supplying voltage to the second glow-lamp, means for connecting the second glow-lamp to the vacuum-tube-voltmeter output circuit to establish a current in the instrument, and means for subjecting the instrument to the voltage of the first-named glow-lamp in a direction such as to oppose and normally to neutralize the said current in the instrument.

7. A pulse-counting system having, in combination, vacuum-tube apparatus having an input circuit upon which pulses may be impressed and an output circuit, a glow-lamp, means for supplying voltage to the glow-lamp, means for connecting the glow-lamp to the output circuit to establish a current in the output circuit in response to the voltage of the pulses impressed upon the input circuit, means for preventing current flow in the output circuit in the absence of pulses impressed upon the input circuit, means for converting the pulses impressed upon the input circuit into current pulses in the output circuit, means for integrating a plurality of the charges produced by the current pulses in the output circuit comprising a condenser upon which the charges may become integrated, connected to the output circuit to be charged by the current pulses in the output circuit, a vacuum-tube voltmeter having an input circuit connected across the condenser to measure its integrated charge and an output circuit having an instrument, a second glow-lamp, means for supplying voltage to the second glow-lamp, means for connecting the second glow-lamp to the vacuum-tube-voltmeter output circuit to establish a current in the instrument, and means for subjecting the instrument to the voltage of the first-named glow-lamp in a direction such as to oppose and normally to neutralize the said current in the instrument.

8. A pulse-counting system having, in combination, vacuum-tube apparatus having a cathode, an anode, a control electrode and a screen electrode, an input circuit connecting the cathode and the control electrode upon which pulses may be impressed, an output circuit connecting the cathode and the anode, means for connecting a source of voltage to the output circuit to establish a current in the output circuit in response to the voltage of the pulses impressed upon the input circuit, means for supplying voltage from the source to the screen electrode, means for biasing the control electrode to prevent current flow in the output circuit in the absence of pulses impressed upon the input circuit to render the output circuit normally non-conducting between pulses, means for impressing the pulses upon the input circuit to render the output circuit conducting during pulses, means for converting the pulses impressed upon the input circuit into current pulses in the output circuit, means for integrating a plurality of the charges produced by the current pulses in the output circuit comprising a condenser upon which the charges may become integrated connected to the output circuit to be charged by the current pulses in the output circuit, a vacuum-tube voltmeter having an input circuit connected across the condenser to measure its integrated charge and an output circuit having an instrument, means for connecting a source of voltage to the vacuum-tube-voltmeter output circuit to establish a current in the instrument, and means for subjecting the instrument to the voltage of the first-named source of voltage in a direction such as to oppose and normally to neutralize the said current in the instrument.

9. A pulse-counting system having, in combination, vacuum-tube apparatus having an input circuit upon which pulses may be impressed and an output circuit, means for connecting a source of voltage to the output circuit to establish a current in the output circuit in response to the voltage of the pulses impressed upon the input circuit, means for biasing the input circuit to prevent current flow in the output circuit in the absence of pulses impressed upon the input circuit to render the output circuit normally non-conducting between pulses, means for impressing the pulses upon the input circuit to render the output circuit conducting during pulses, a condenser connected to the output circuit, a vacuum-tube voltmeter having an input circuit connected across the condenser and an output circuit having an instrument, means for establishing a current in the vacuum-tube-voltmeter output circuit to establish a current in the instrument, a source of energy, and means for applying the potential of the source to oppose and normally to neutralize the flow of current from the vacuum-tube-voltmeter output circuit in the instrument and to establish a flow of current in the vacuum-tube apparatus output circuit.

10. A pulse-counting system having, in combination, vacuum-tube apparatus having a cathode, an anode, a control electrode and a screen electrode, an input circuit connecting the cathode and the control electrode upon which pulses may be impressed, an output circuit connecting the cathode and the anode, a glow-lamp, means for supplying voltage to the glow-lamp, means for connecting the glow-lamp to the output circuit to establish a current in the output circuit in response to the voltage of the pulses impressed upon the input circuit, means for supplying voltage from the glow-lamp to the screen electrode, a voltage-divider connected to the glow-lamp, means connected to the voltage-divider for biasing the control electrode to prevent current flow in the output circuit in the absence of pulses impressed upon the input circuit to render the output circuit normally non-conducting between pulses, means for impressing the pulses upon the input circuit to render the output circuit conducting during pulses, means for converting the pulses impressed upon the input circuit into current pulses in the output circuit, means for integrating a plurality of the charges produced by the current pulses in the output circuit comprising a condenser upon which the charges may become integrated connected to the output circuit to be charged by the current pulses in the output circuit, a vacuum-tube voltmeter having an input circuit connected across the condenser to measure its integrated charge and an output circuit having an instrument, means for connecting a source of voltage to the vacuum-tube-voltmeter output circuit to establish a current in the instrument, and means for subjecting the instrument to the voltage of the glow-lamp in a direction such as to oppose and normally to neutralize the said current in the instrument.

11. A pulse-counting system having, in combination, vacuum-tube apparatus having an input circuit upon which pulses may be impressed and an output circuit, means for connecting a source of voltage to the output circuit to establish a current in the output circuit in response to the voltage of the pulses impressed upon the input circuit, means for converting the pulses impressed upon the input circuit into current pulses in the output circuit, means for integrating a plurality of the charges produced by the current pulses in the output circuit comprising a polystyrene condenser upon which the charges may become integrated connected in the output circuit to be charged by the current pulses in the output circuit, a vacuum-tube voltmeter having an input circuit connected across the condenser to measure its integrated charge and an output circuit having an instrument, means for establishing a current in the vacuum-tube-voltmeter output circuit to establish a current in the instrument, a source of energy, and means for applying the potential of the source to oppose and normally to neutralize the flow of current from the vacuum-tube-voltmeter output circuit in the instrument and to establish a flow of current in the vacuum-tube-apparatus output circuit.

12. A pulse-counting system having, in combination, a polystyrene condenser, vacuum-tube apparatus for applying pulses to the condenser, a degenerative vacuum-tube voltmeter connected to the condenser, the voltmeter having an instrument, a source of energy, means for connecting the vacuum-tube voltmeter to the source to subject the instrument to the potential of the source, a second source of energy, means for connecting the instrument to the second source to subject the instrument to the potential of the second source in a sense opposite to the sense of, and normally to neutralize, the potential applied to the instrument by the first-named source, and means for impressing the voltage of the second source upon the output circuit of the vacuum-tube apparatus.

13. A pulse-counting system having, in combination, vacuum-tube apparatus having an input circuit and an output circuit having a voltage supply, a condenser in the output circuit shunted by a high resistance, vacuum-tube apparatus having an input circuit connected directly across the condenser and having an output circuit containing an indicating meter, the first vacuum-tube apparatus being normally biased to cut-off whereby, in the absence of pulses, no direct voltage appears across the condenser, the second named output circuit having a source of voltage to provide current for the second named output circuit, means whereby the said current is caused to flow in the indicating meter, and means for connecting the voltage supply to the meter in such direction as to oppose and normally to neutralize the said current.

WILLIAM N. TUTTLE.